(12) United States Patent
Hirosawa

(10) Patent No.: US 10,338,714 B2
(45) Date of Patent: Jul. 2, 2019

(54) DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 5 days.

(21) Appl. No.: 15/674,611

(22) Filed: Aug. 11, 2017

(65) Prior Publication Data

US 2018/0059840 A1    Mar. 1, 2018

(30) Foreign Application Priority Data

Aug. 26, 2016    (JP) .................................. 2016-165947

(51) Int. Cl.
| | | |
|---|---|---|
| *G02F 1/1343* | (2006.01) | |
| *G06F 3/041* | (2006.01) | |
| *G02F 1/1333* | (2006.01) | |
| *G02F 1/1335* | (2006.01) | |
| *G02F 1/1362* | (2006.01) | |
| *G06F 3/044* | (2006.01) | |

(52) U.S. Cl.
CPC ........ *G06F 3/0412* (2013.01); *G02F 1/13338* (2013.01); *G02F 1/133345* (2013.01); *G02F 1/133512* (2013.01); *G02F 1/133514* (2013.01); *G02F 1/134309* (2013.01); *G02F 1/136286* (2013.01); *G06F 3/044* (2013.01); *G06F 3/0416* (2013.01); *G02F 1/136209* (2013.01); *G02F 2001/134372* (2013.01); *G02F 2001/136218* (2013.01); *G02F 2001/136222* (2013.01); *G02F 2001/136295* (2013.01); *G02F 2201/121* (2013.01); *G02F 2201/123* (2013.01); *G06F 2203/04108* (2013.01)

(58) Field of Classification Search
CPC ......... G02F 1/133512; G02F 1/136209; G02F 2001/136218; G02F 1/136286; G02F 1/13338; G02F 1/133345; G06F 3/0412; G06F 3/0416

See application file for complete search history.

(56) References Cited

U.S. PATENT DOCUMENTS

| | | | | |
|---|---|---|---|---|
| 5,724,107 A | * | 3/1998 | Nishikawa | ........ G02F 1/136213 349/110 |
| 2012/0249940 A1 | * | 10/2012 | Choi | ................. G02F 1/133753 349/123 |
| 2013/0077008 A1 | * | 3/2013 | Kim | ................. G02F 1/136227 349/42 |

(Continued)

FOREIGN PATENT DOCUMENTS

JP    2014-74734    4/2014

*Primary Examiner* — Jia X Pan
(74) *Attorney, Agent, or Firm* — Oblon, McClelland, Maier & Neustadt, L.L.P.

(57) ABSTRACT

According to one embodiment, a display device includes a first substrate including an insulating substrate, a color filter layer located above the insulating substrate, a signal line located between the insulating substrate and the color filter layer, a metal line located above the color filter layer, a first light-shielding layer stacked on the metal line, a common electrode located above the first light-shielding layer, a pixel electrode opposed to the common electrode, a second substrate opposed to the first substrate, and a liquid crystal layer held between the first substrate and the second substrate.

18 Claims, 9 Drawing Sheets

(56) References Cited

U.S. PATENT DOCUMENTS

| | | | | |
|---|---|---|---|---|
| 2014/0168537 A1* | 6/2014 | Han | ............ | G06F 3/0412 |
| | | | | 349/12 |
| 2014/0176885 A1* | 6/2014 | Okita | ............ | G02F 1/133512 |
| | | | | 349/106 |
| 2016/0253023 A1* | 9/2016 | Aoyama | ............ | G06F 3/0416 |
| | | | | 345/174 |
| 2016/0299385 A1* | 10/2016 | Park | ............ | H01L 27/124 |
| 2016/0299395 A1* | 10/2016 | Kosuge | ............ | G02F 1/136209 |
| 2017/0160852 A1* | 6/2017 | Ahn | ............ | H01L 27/323 |
| 2017/0317114 A1* | 11/2017 | Noh | ............ | H01L 27/1251 |

\* cited by examiner

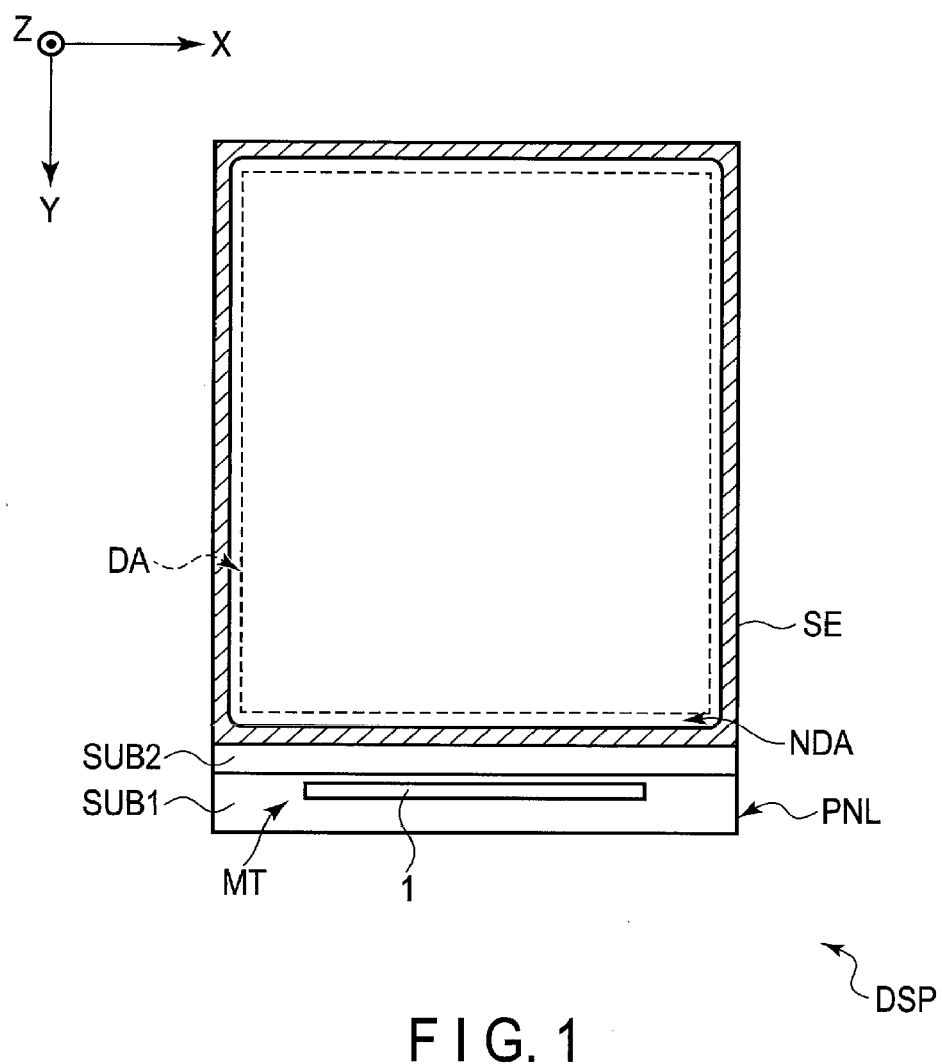
F I G. 1

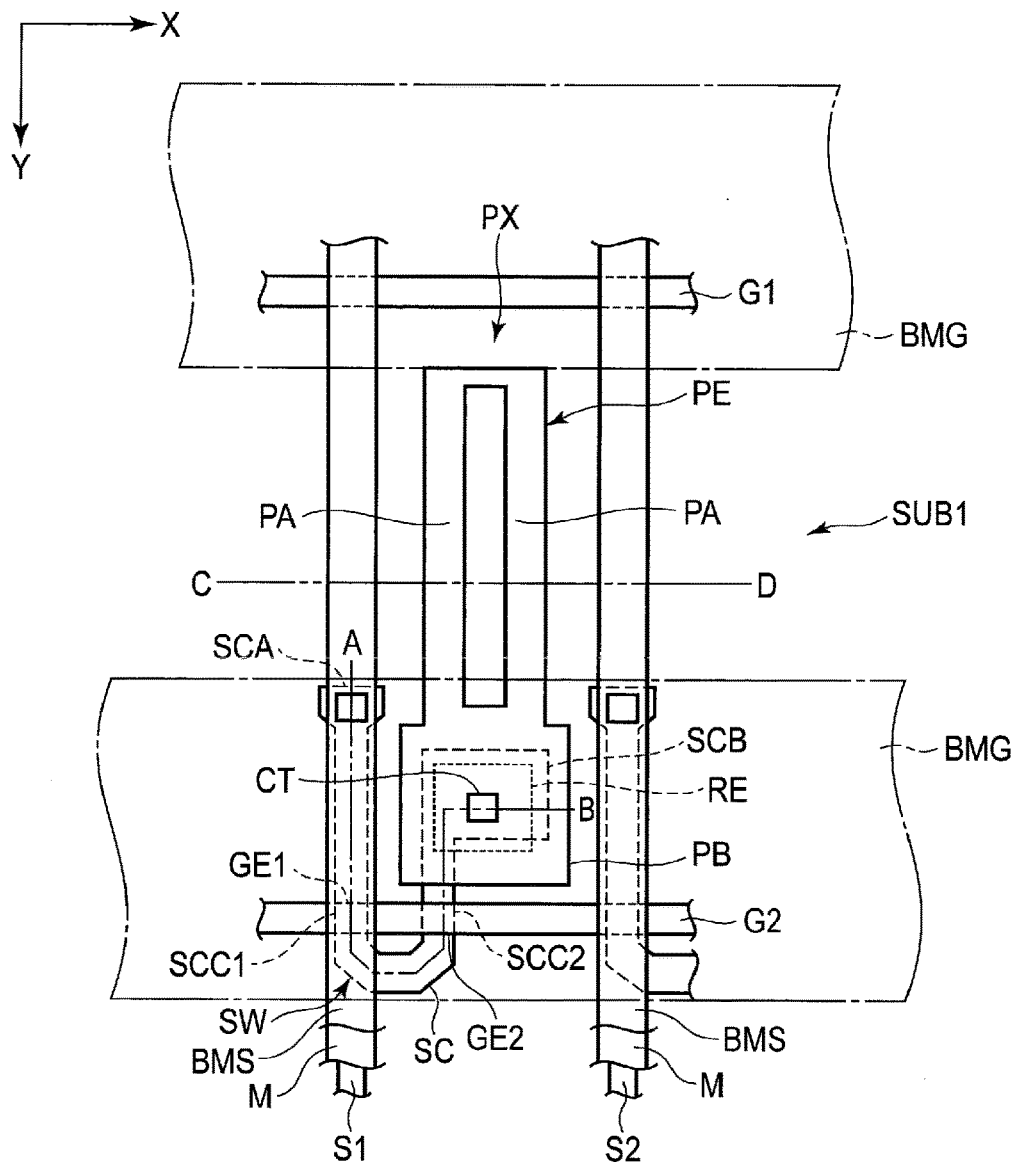
F I G. 3

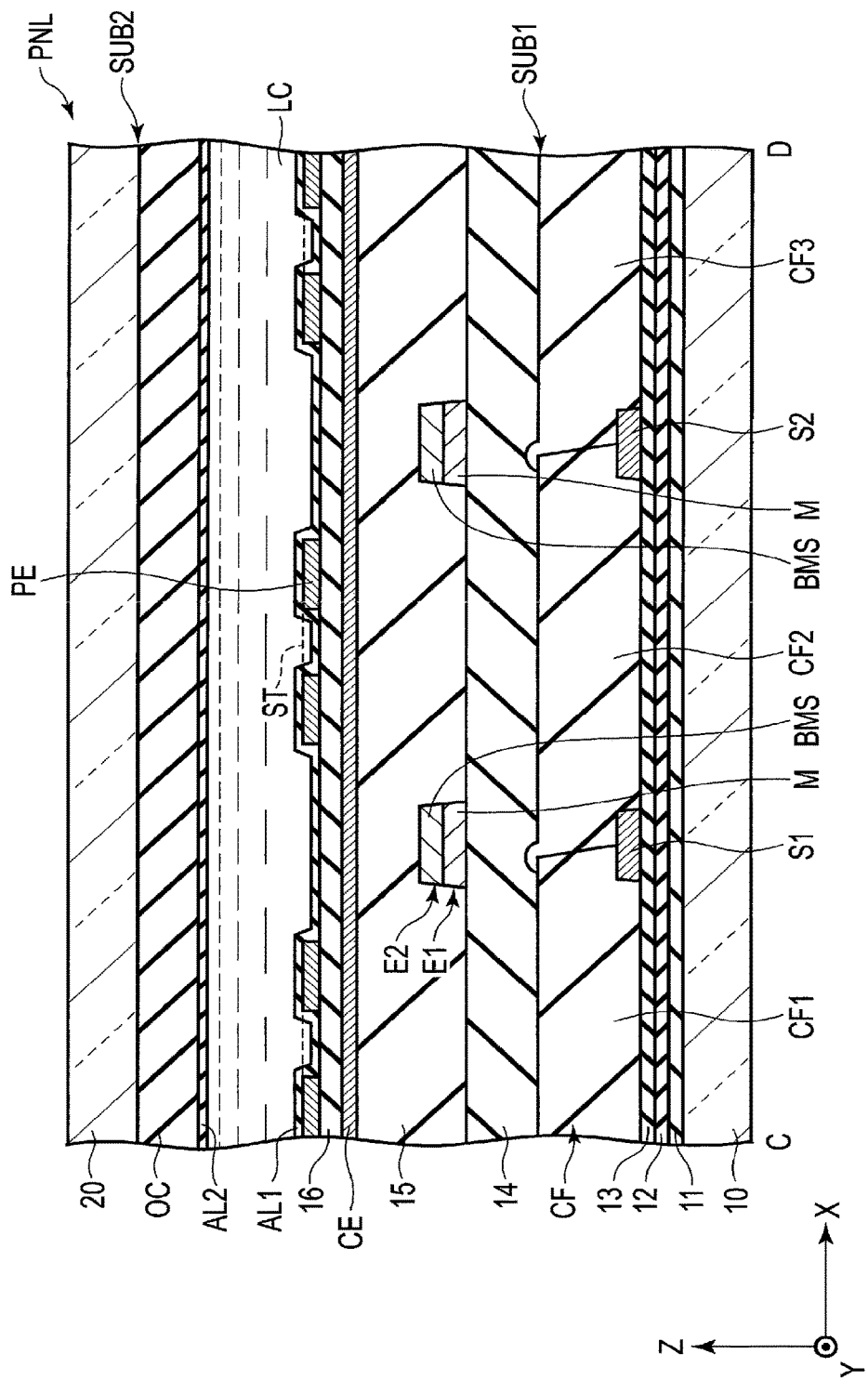
F I G. 5

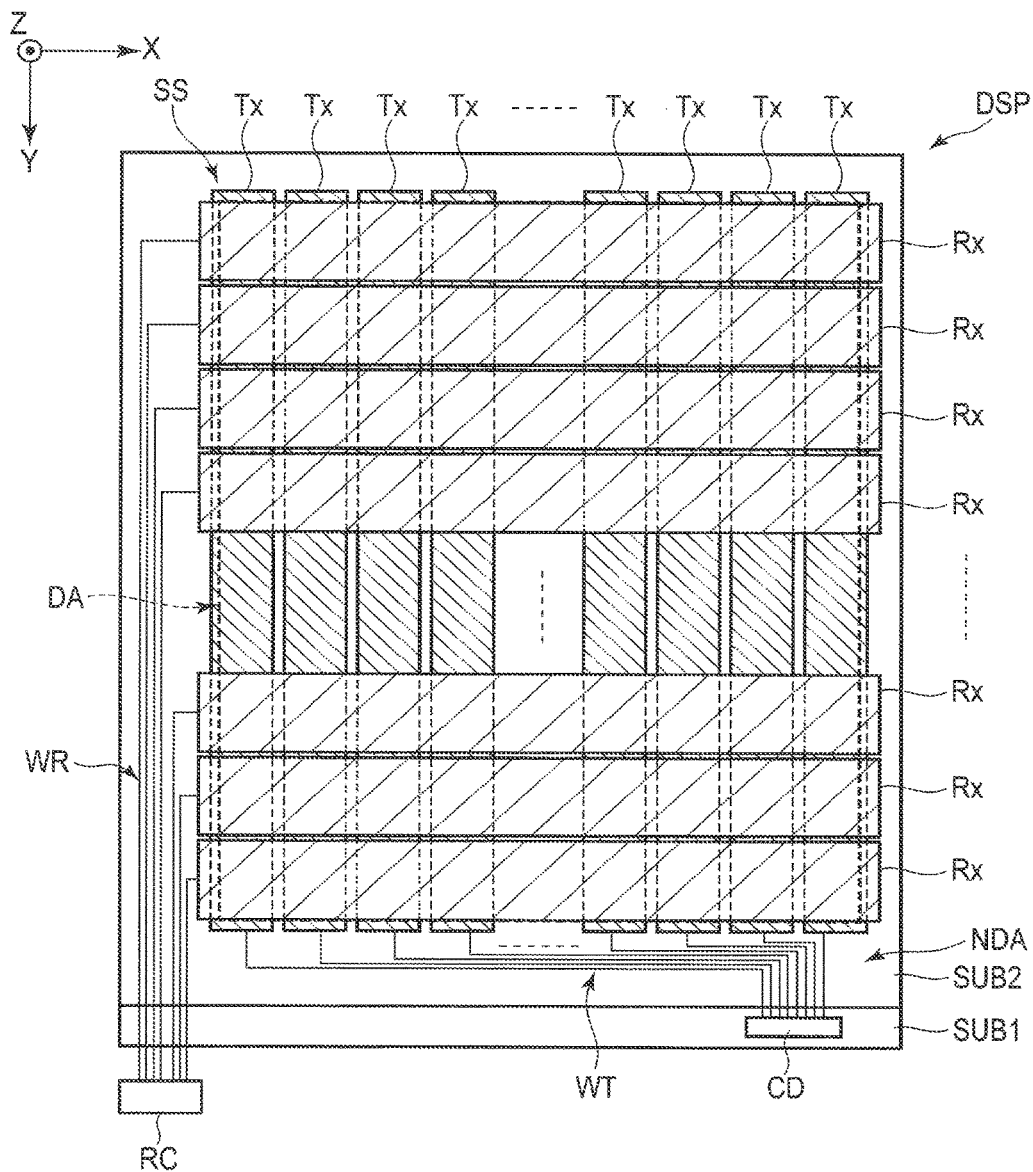
F I G. 12

DISPLAY DEVICE

CROSS-REFERENCE TO RELATED APPLICATIONS

This application is based upon and claims the benefit of priority from Japanese Patent Application No. 2016-165947, filed Aug. 26, 2016, the entire contents of which are incorporated herein by reference.

FIELD

Embodiments described herein relate generally to a display device.

BACKGROUND

Recently, sensors capable of detecting touch or approach of an object such as a finger have been put into practical use as an interface, etc., of a display device. For example, as a display device comprising a capacitive sensor, a liquid crystal display device comprising an array substrate provided with a color filter and a detection electrode on a signal line is proposed.

BRIEF DESCRIPTION OF THE DRAWINGS

FIG. 1 is an illustration showing the structure of a display device DSP of the present embodiment.

FIG. 3 is a plan view showing a configuration example of a pixel PX when a first substrate SUB1 shown in FIG. 1 is viewed from a second substrate.

FIG. 5 is a cross-sectional view showing the structure of a part of the display panel PNL taken along line C-D of FIG. 3.

FIG. 12 is a plan view showing a configuration example of a sensor SS.

DETAILED DESCRIPTION

Figure 2:
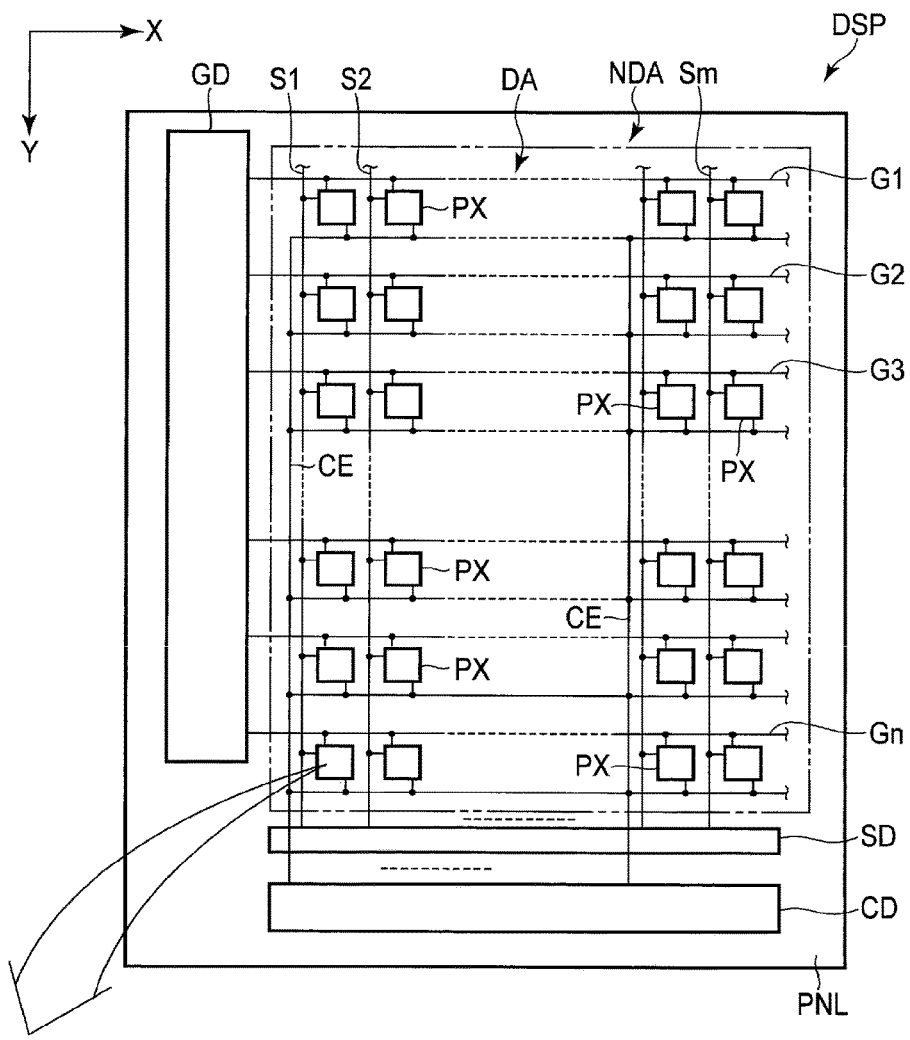
FIG. 2 is an illustration showing a basic structure and an equivalent circuit of the display panel PNL shown in FIG. 1.
Figure 2:
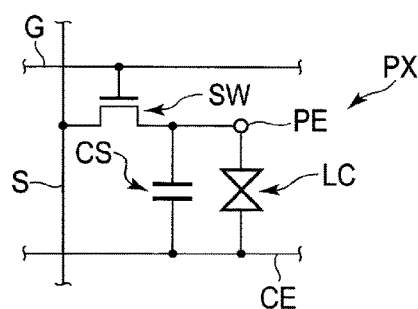

In general, according to one embodiment, a display device includes: a first substrate including an insulating substrate, a color filter layer located above the insulating substrate, a signal line located between the insulating substrate and the color filter layer, a metal line located above the color filter layer, a first light-shielding layer stacked on the metal line, a common electrode located above the first light-shielding layer, a pixel electrode opposed to the common electrode; a second substrate opposed to the first substrate; and a liquid crystal layer held between the first substrate and the second substrate.

According to another embodiment, a display device includes: a display area; a non-display area surrounding the display area; a relay electrode located in the non-display area; a first interlayer insulating film located above the relay electrode; a metal line extending above the first interlayer insulating film in the display area and the non-display area; a second interlayer insulating film located above the first interlayer insulating film and the metal line; and a common electrode extending above the second interlayer insulating film in the display area and the non-display area, the first interlayer insulating film including a contact hole penetrated to the relay electrode, the metal line and the common electrode being in contact with the relay electrode at the contact hole.

According to yet another embodiment, a display device includes: a first substrate including an insulating substrate, a signal line, a first organic insulating film located above the signal line, a metal line located above the first organic insulating film, an insulator stacked on the metal line, a second organic insulating film which covers the insulator, a common electrode located above the second organic insulating film, and a pixel electrode opposed to the common electrode; a second substrate opposed to the first substrate; and a liquid crystal layer held between the first substrate and the second substrate.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing the structure of a display device DSP of the present embodiment. While a first direction X, a second direction Y, and a third direction Z are orthogonal to each other, they may cross each other at an angle other than 90 degrees. The first direction X and the second direction Y correspond to directions parallel to a main surface of a substrate which constitutes the display device DSP, and the third direction Z corresponds to a thickness direction of the display device DSP. The figure shows a plan view of the display device DSP in an X-Y plane defined by the first direction X and the second direction Y. In the present embodiment, a liquid crystal display device is explained as an example of the display device. Note that the main structures disclosed in the present embodiment are applicable to display devices such as a self-luminous display device with organic electroluminescent display elements and the like, an electronic paper display device with cataphoretic elements and the like, a display device employing micro-electromechanical systems (MEMS), and a display device employing electrochromism.

The display device DSP includes a display panel PNL, an IC chip 1 which drives the display panel PNL, etc. The display panel PNL is, for example, a liquid crystal display panel, and includes a first substrate SUB1, a second substrate SUB2, a sealant SE, and a liquid crystal layer (a liquid crystal layer LC which will be described later). The first substrate SUB1 and the second substrate SUB2 are opposed to each other in the third direction Z. In the following explanation, a direction from the first substrate SUB1 toward the second substrate SUB2 is referred to as upward (or merely above), and a direction from the second substrate SUB2 toward the first substrate SUB1 is referred to as downward (or merely below). Further, a view from the second substrate SUB2 toward the first substrate SUB1 is called a planar view.

The sealant SE bonds the first substrate SUB1 and the second substrate SUB2 together. The display panel PNL includes a display area DA in which an image is displayed, and a non-display area NDA which surrounds the display area DA. The display area DA is located at an inner side surrounded by the sealant SE. The sealant SE is located at the non-display area NDA.

The IC chip 1 is located in the non-display area NDA. In the example illustrated, the IC chip 1 is mounted on a mounting portion MT of the first substrate SUB1 extending to an outer side relative to the second substrate SUB2. In the IC chip 1, a display driver which outputs a signal necessary for displaying an image, for example, is incorporated. The display driver described in this specification includes at least a part of a signal line drive circuit SD, a scanning line drive circuit GD, and a common electrode drive circuit CD, which will be described later. Note that the location of the IC chip 1 is not limited to that indicated in the illustrated example, and the IC chip 1 may be mounted on a flexible substrate connected to the display panel PNL separately. Also, a detection circuit which functions as a touch panel controller may be incorporated in the IC chip 1.

The display panel PNL of the present embodiment may be a transmissive display panel having a transmissive display function of displaying an image by selectively transmitting light from a rear surface of the first substrate SUB1, a reflective display panel having a reflective display function of displaying an image by selectively reflecting light from a front surface of the second substrate SUB2, or a transflective display panel including both the transmissive display function and the reflective display function.

FIG. 2 is an illustration showing a basic structure and an equivalent circuit of the display panel PNL shown in FIG. 1.

The display panel PNL includes a plurality of pixels PX in the display area DA. Here, the pixel is intended as a minimum unit which can be individually controlled in accordance with a pixel signal, and exists in, for example, an area including a switching element arranged at a position where a scanning line and a signal line, which will be described later, cross each other. The pixels PX are arrayed in a matrix in the first direction X and the second direction Y. Also, the display panel PNL includes scanning lines G (G1 to Gn), signal lines S (S1 to Sm), a common electrode CE, etc., in the display area DA. The scanning lines G extend in the first direction X, and are arranged in the second direction Y. The signal lines S extend in the second direction Y, and are arranged in the first direction X. Note that the scanning lines G and the signal lines S do not necessarily extend linearly, and may be partially bent. The common electrode CE is disposed over the pixels PX.

Each of the scanning lines G, the signal lines S, and the common electrode CE is drawn to the non-display area NDA. In the non-display area NDA, the scanning lines G are connected to the scanning line drive circuit GD, the signal lines S are connected to the signal line drive circuit SD, and the common electrode CE is connected to the common electrode drive circuit CD. The signal line drive circuit SD, the scanning line drive circuit GD, and the common electrode drive circuit CD may be formed on the first substrate SUB1, or these circuits may be partly or entirely incorporated in the IC chip 1 illustrated in FIG. 1. Also, the layout of the drive circuits is not limited to the example illustrated. For example, the scanning line drive circuits GD may be disposed on both sides of the display area DA so as to sandwich the display area DA.

Each of the pixels PX comprises the switching element SW, a pixel electrode PE, the common electrode CE, the liquid crystal layer LC, and the like. The switching element SW is constituted by a thin-film transistor (TFT), for example, and is electrically connected to the scanning line G and the signal line S. The scanning line G is connected to the switching elements SW of the respective pixels PX arranged in the first direction X. The signal line S is connected to the switching elements SW of the respective pixels PX arranged in the second direction Y. The pixel electrode PE is electrically connected to the switching element SW. Each pixel electrode PE is opposed to the common electrode CE, and drives the liquid crystal layer LC by an electric field produced between the pixel electrode PE and the common electrode CE. A storage capacitance CS is formed between, for example, the common electrode CE and the pixel electrode PE.

FIG. 3 is a plan view showing a configuration example of the pixel PX when the first substrate SUB1 shown in FIG. 1 is viewed from the second substrate. The illustrated example corresponds to a case where a fringe field switching (FFS) mode, which is one of display modes using a lateral electric field, is applied.

The first substrate SUB1 includes the scanning lines G1 and G2, the signal lines S1 and S2, the switching element SW, the pixel electrode PE, a metal line M, a first light-shielding layer BMS, etc. Note that while the first substrate SUB1 comprises the common electrode in one example, here, illustration of the common electrode is omitted.

The scanning lines G1 and G2 are disposed at an interval along the second direction Y, and each of the scanning lines G1 and G2 extends in the first direction X. The signal lines S1 and S2 are disposed at an interval along the first direction X, and each of the signal lines S1 and S2 extends in the second direction Y. In the example illustrated, the pixel PX corresponds to a box-shaped area which is defined by the scanning lines G1 and G2 and the signal lines S1 and S2, and is rectangular in shape in which a length along the first direction X is shorter than a length along the second direction Y. Note that the shape of the pixel PX is not limited to a rectangle, and can be changed as appropriate.

The switching element SW is electrically connected to the scanning line G2 and the signal line S1. The switching element SW of the illustrated example is composed of a thin-film transistor having a double-gate structure. The switching element SW comprises a semiconductor layer SC and a relay electrode RE. The semiconductor layer SC is disposed such that a part of it overlaps the signal line S1, and the other part is extended between the signal lines S1 and S2, and is formed to be substantially U-shaped. The semiconductor layer SC includes a channel region SCC1 which crosses the scanning line G2 in an area overlapping the signal line S1, and a channel region SCC2 which crosses the scanning line G2 in an area between the signal lines S1 and S2. In the scanning line G2, areas which overlap the channel regions SCC1 and SCC2 serve as gate electrodes GE1 and GE2, respectively. The semiconductor layer SC is electrically connected to the signal line S1 at an end portion SCA of the semiconductor layer SC, and is electrically connected to the relay electrode RE at the other end portion SCB of the semiconductor layer SC. The relay electrode RE is formed in an island shape, and is disposed between the scanning lines G1 and G2, and between the signal lines S1 and S2. Note that the switching element SW may be composed of a thin-film transistor having a single-gate structure. Also, while the switching element SW is of a top-gate structure having a gate electrode GE on top of the semiconductor layer SC in one example, it may be of a bottom-gate structure having the gate electrode GE under the semiconductor layer SC.

The pixel electrode PE is disposed between the scanning lines G1 and G2, and between the signal lines S1 and S2. The pixel electrode PE comprises a main electrode portion PA and a sub-electrode portion PB. The main electrode portion PA and the sub-electrode portion PB are formed integrally or continuously, and are electrically connected to each other. The pixel electrode PE illustrated comprises two main electrode portions PA extending from the sub-electrode portion PB toward the scanning line G1. Each of the main electrode portions PA extends linearly in the second direction Y (or substantially parallel to the signal lines S1 and S2). The two main electrode portions PA are arranged in the first direction X at an interval, and each of them is formed in a strip shape having a substantially uniform width along the first direction X. The sub-electrode portion PB is disposed at a position which overlaps the relay electrode RE, and is electrically connected to the relay electrode RE. The pixel electrode PE is thereby electrically connected to the switching element SW. Note that the shape of the pixel electrode PE is not limited to the example illustrated, and can be changed as appropriate according to the shape, etc., of the pixel PX.

The metal line M and the first light-shielding layer BMS extend substantially parallel to each of the signal lines S1 and S2. In the example illustrated, the metal line M and the first light-shielding layer BMS extend in the second direction Y.

The metal lines M are located above the signal lines S1 and S2, and overlap the signal lines S1 and S2, respectively, in planar view. A width of each of the metal lines M along the first direction X should preferably be greater than or equal to a width of each of the signal lines S1 and S2 along the first direction X.

The first light-shielding layer BMS is stacked on the metal line M. The first light-shielding layer BMS is formed of a material having a reflectance lower than that of the metal line M. The first light-shielding layer BMS overlaps the metal line M in planar view. A width of the first light-shielding layer BMS along the first direction X should preferably be greater than or equal to the width of the metal line M along the first direction X. The first light-shielding layer BMS as described above blocks light directed toward the signal lines S1 and S2 from the second substrate SUB2 side, or blocks light reflected by the signal lines S1 and S2. Further, the first light-shielding layer BMS can block light directed toward the metal line M from the second substrate SUB2 side, and suppress undesired reflection at the metal line M.

Further, as shown by a one-dot chain line in the drawing, a second light-shielding layer BMG extends substantially parallel to each of the scanning lines G1 and G2. In the example illustrated, each of the second light-shielding layers BMG extends in the first direction X. The second light-shielding layers BMG are provided on the second substrate SUB2, as will be described later. The second light-shielding layers BMG overlap the scanning lines G1 and G2, respectively, in planar view. A width of the second light-shielding layer BMG along the second direction Y should preferably be greater than or equal to a width of each of the scanning lines G1 and G2 along the second direction Y. Note that in the example illustrated, the second light-shielding layer BMG also overlaps a contact portion CT where the pixel electrode PE and the switching element SW are connected, in planar view. The second light-shielding layer BMG as described above blocks light directed toward the scanning lines G1 and G2 from the second substrate SUB2 side, or blocks light reflected by the scanning lines G1 and G2.

Figure 4:
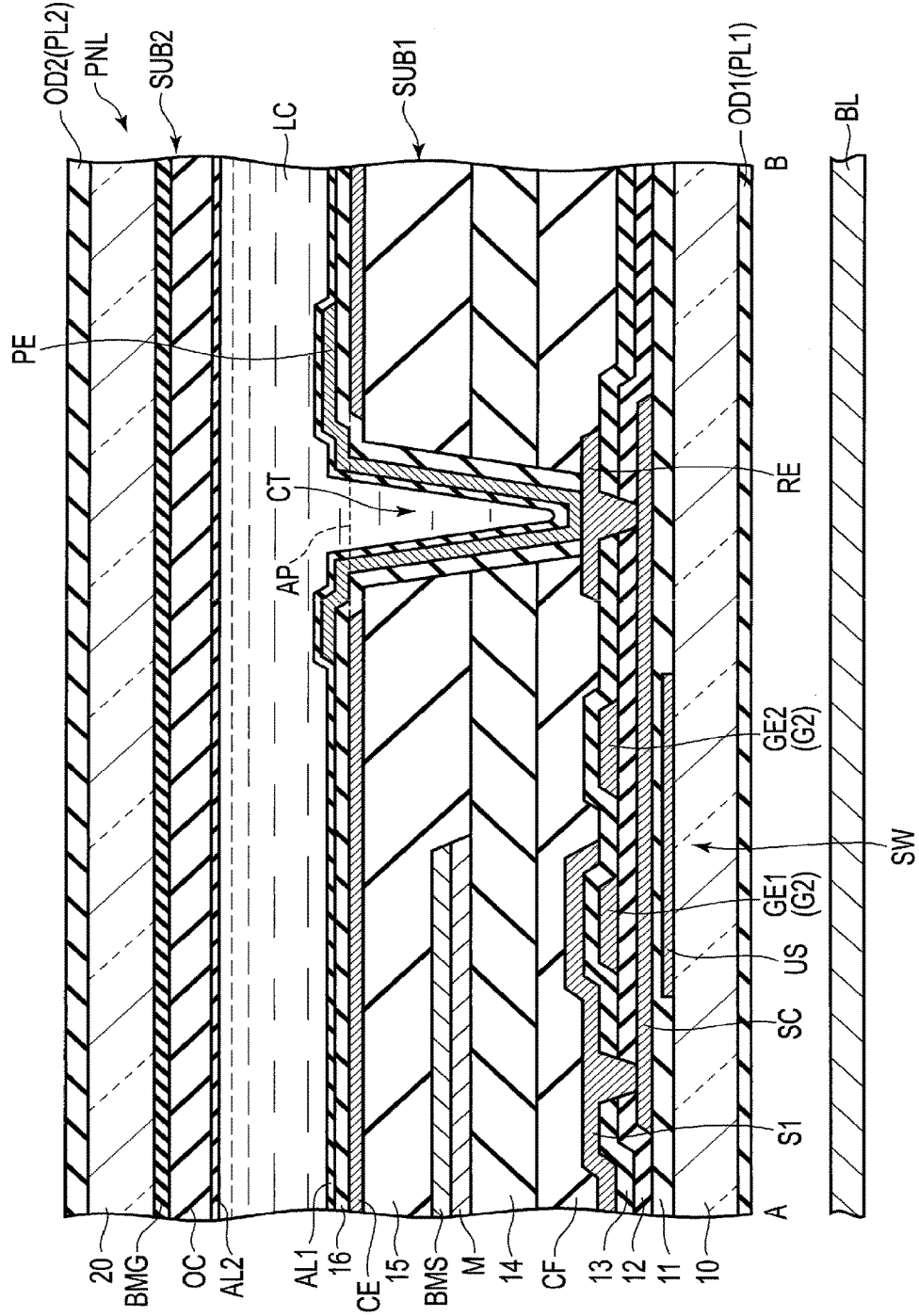
FIG. 4 is a cross-sectional view showing the structure of a part of the display panel PNL taken along line A-B of FIG. 3.

FIG. 4 is a cross-sectional view showing the structure of a part of the display panel PNL taken along line A-B of FIG. 3.

The first substrate SUB1 includes a first insulating substrate 10, a first insulating film 11, a second insulating film 12, a third insulating film 13, a fourth insulating film 14, a fifth insulating film 15, a sixth insulating film 16, a color filter layer CF, a lower light-shielding layer US, the semiconductor layer SC, the scanning line G2, the signal line S1, the relay electrode RE, the metal line M, the first light-shielding layer BMS, the common electrode CE, the pixel electrode PE, a first alignment film AL1, and the like.

The first insulating substrate 10 is a light transmissive substrate such as a glass substrate or a resin substrate. The lower light-shielding layer US is located on the first insulating substrate 10 and is covered with the first insulating film 11. The lower light-shielding layer US blocks light directed toward the semiconductor layer SC from a backlight unit BL. The semiconductor layer SC is located on the first insulating film 11 and is covered with the second insulating film 12. The semiconductor layer SC is formed of, for example, polycrystalline silicon, but may be formed of amorphous silicon or an oxide semiconductor.

The gate electrodes GE1 and GE2, which are parts of the scanning line G2, are disposed on the second insulating film 12, and are covered with the third insulating film 13. Note that the scanning line G1, which is not illustrated, is also disposed in the same layer as the scanning line G2. The scanning line G2 is formed of a metal material such as aluminum (Al), titanium (Ti), silver (Ag), molybdenum (Mo), tungsten (W), copper (Cu) or chromium (Cr), or an alloy obtained by combining the aforementioned metal materials. The scanning line G2 may have a single-layer structure or a multilayer structure. Preferably, the lower light-shielding layer US should be located directly under the semiconductor layer SC at a position opposed to the gate electrodes GE1 and GE2.

The signal line S1 and the relay electrode RE are located on the third insulating film 13, and are covered with the fourth insulating film 14. Note that the signal line S2, which is not illustrated, is also disposed in the same layer as the signal line S1. The signal line S1 and the relay electrode RE are formed of the same material, and the above-mentioned metal materials can be applied. The signal line S1 is in contact with the semiconductor layer SC through a contact hole which penetrates the second insulating film 12 and the third insulating film 13. The relay electrode RE is in contact with the semiconductor layer SC through a contact hole which penetrates the second insulating film 12 and the third insulating film 13.

The color filter layer CF is located above the signal line S1, the switching element SW, the relay electrode RE, and the third insulating film 13. Such a color filter CF is formed of a colored resin.

The fourth insulating film 14 is located on the color filter layer CF. The fourth insulating film 14 is formed of a transparent organic insulating material such as acrylic resin. The fourth insulating film 14 corresponds to a first organic insulating film located between the color filter layer CF and the metal line M. Also, from another standpoint, the color filter layer CF and the fourth insulating film 14 correspond to a first interlayer insulating film.

The metal line M is located on the fourth insulating film 14. The metal line M is formed of, for example, the metal material described above or an alloy formed of a combination of the above metal materials, and may have a single-layer structure or a multilayer structure.

The first light-shielding layer BMS is stacked on the metal line M. The first light-shielding layer BMS may be formed of an organic insulating material such as black resin, or a material having a reflectance lower than that of the metal line M. Further, the first light-shielding layer BMS may be one which includes an antireflective layer. Furthermore, it is sufficient if the first light-shielding layer BMS is an object having a light-shielding property and low reflectivity, and may be an insulator whose conductivity is lower than that of a transparent conductive material as typified by indium tin oxide (ITO), for example.

The fifth insulating film 15 is located above the fourth insulating film 14, the metal line M, and the first light-shielding layer BMS. The fifth insulating film 15 is formed of a transparent organic insulating material such as acrylic resin. The fifth insulating film 15 is stacked on the first organic insulating film (the fourth insulating film 14), and corresponds to a second organic insulating film covering the metal line M and the first light-shielding layer BMS. Also, from another standpoint, the fifth insulating film 15 corresponds to a second interlayer insulating film.

The common electrode CE is located on the fifth insulating film 15 and is covered with the sixth insulating film 16. The common electrode CE is located directly above the scanning line G2, the signal line S1, and the switching element SW. Also, the common electrode CE is located directly above the other scanning line G1 and the other signal line S2 which are not illustrated, and includes an aperture AP at a position corresponding to the contact portion CT. The pixel electrode PE is located on the sixth insulating film 16 and is covered with the first alignment film AL1. A part of the pixel electrode PE is opposed to the common electrode CE via the sixth insulating film 16. The common electrode CE and the pixel electrode PE are formed of a transparent oxide conductive material such as indium tin oxide (ITO) or indium zinc oxide (IZO). The pixel electrode PE is in contact with the relay electrode RE through a contact hole which penetrates the color filter layer CF, the fourth insulating film 14, the fifth insulating film 15, and the sixth insulating film 16 at the contact portion CT which overlaps the aperture AP of the common electrode CE.

Each of the first insulating film 11, the second insulating film 12, the third insulating film 13, and the sixth insulating film 16 is an inorganic insulating film such as silicon oxide, silicon nitride, or silicon oxynitride, and may have a single-layer structure or a multilayer structure. Note that the other insulating film may be interposed between the third insulating film 13 and the color filter layer CF, between the color filter layer CF and the fourth insulating film 14, and between the fourth insulating film 14 and the fifth insulating film 15.

The second substrate SUB2 comprises a second insulating substrate 20, the second light-shielding layer BMG, an overcoat layer OC, a second alignment film AL2, etc.

The second insulating substrate 20 is a light transmissive substrate such as a glass substrate or a resin substrate. The second light-shielding layer BMG is located on the second insulating substrate 20 at the side opposed to the first substrate SUB1. The second light-shielding layers BMG are formed in stripes as described above, and are each located directly above the scanning line G and the switching element SW. The overcoat layer OC covers the second light-shielding layers BMG. The second alignment film AL2 covers the overcoat layer OC.

The first substrate SUB1 and the second substrate SUB2 described above are arranged such that the first alignment film AL1 and the second alignment film AL2 are opposed to each other. A spacer is formed of a resin material, and is arranged between the first substrate SUB1 and the second substrate SUB2 though this is not illustrated in the drawing. The spacer is formed on one of the first substrate SUB1 and the second substrate SUB2, and is in contact with the other one of those substrates. A predetermined cell gap is thereby formed between the first alignment film AL1 and the second alignment film AL2. However, apart from the spacer which forms the cell gap, the spacer may include a sub-spacer which does not contact the other one of the substrates in the steady state in which no external stress is applied to the display panel. The cell gap is, for example, 2 to 5 µm. The first substrate SUB1 and the second substrate SUB2 are adhered to each other by a sealant with a predetermined cell gap formed between the substrates.

The liquid crystal layer LC is located between the first substrate SUB1 and the second substrate SUB2, and is held between the first alignment film AL1 and the second alignment film AL2. The liquid crystal layer LC includes liquid crystal molecules. The liquid crystal layer LC described above is composed of, for example, a positive liquid crystal material (i.e., a liquid crystal material with positive dielectric anisotropy), or a negative liquid crystal material (i.e., a liquid crystal material with negative dielectric anisotropy).

With respect to the display panel PNL of the above structure, a first optical element OD1 including a first polarizer PL1 is arranged on the lower side of the first substrate SUB1. Further, a second optical element OD2 including a second polarizer PL2 is arranged on the upper side of the second substrate SUB2. In one example, the first polarizer PL1 and the second polarizer PL2 are arranged such that their absorption axes are orthogonal to each other in the X-Y plane. Note that the first optical element OD1 and the second optical element OD2 may include a retardation film such as a quarter-wave plate or a half-wave plate, a scattering layer, an antireflective layer, etc., if necessary.

In such a configuration example, in an off-state in which no electric field is produced between the pixel electrode PE and the common electrode CE, liquid crystal molecules included in the liquid crystal layer LC are initially aligned in a predetermined direction between the first alignment film AL1 and the second alignment film AL2. In this off-state, light irradiated from the backlight unit BL toward the display panel PNL is absorbed by the first optical element OD1 and the second optical element OD2 and the display becomes dark. Meanwhile, in an on-state in which an electric field is produced between the pixel electrode PE and the common electrode CE, the liquid crystal molecules are aligned in a direction different from the initial alignment direction by the electric field, and this alignment direction is controlled by the electric field. In such an on-state, part of the light from the backlight unit EL is transmitted through the first optical element OD1 and the second optical element OD2 and the display becomes bright.

FIG. 5 is a cross-sectional view showing the structure of a part of the display panel PNL taken along line C-D of FIG. 3.

In the first substrate SUB1, the main portions will be described. The color filter layer CF includes a first color filter CF1, a second color filter CF2, and a third color filter CF3. The first to third color filters CF1 to CF3 are arranged in the first direction X. In one example, the first color filter CF1 is a red color filter, the second color filter CF2 is a green color filter, and the third color filter CF3 is a blue color filter. Note that selection of colors for the first to third color filters CF1 to CF3 is not limited to that of the above example. For example, the color filter layer CF may include a fourth color filter whose color is different from the colors of the first to third color filters CF1 to CF3. As the fourth color filter, a white color filter or an uncolored resin material may be arranged, for example. Alternatively, a transparent fourth insulating film 14 may be arranged without arranging the color filter.

The signal lines S1 and S2 are located between the first insulating substrate 10 and the color filter layer CF. An edge of each of the first color filter CF1 and the second color filter CF2 overlaps the signal line S1. Further, an edge of each of the second color filter CF2 and the third color filter CF3 overlaps the signal line S2. Note that a protective film may be interposed between the signal lines S1 and S2 and the color filter layer CF so as to suppress corrosion caused by contact between the signal lines and the color filter layer.

The metal lines M are located directly above the signal lines S1 and S2, respectively. In the example illustrated, the color filter layer CF and the fourth insulating film 14 are interposed between the metal lines M and the signal lines S1 and S2. The fourth insulating film 14 covers the color filter layer CF, suppresses leakage of impurities from the color filter layer CF, and reduces a difference in level between the color filters of different colors.

The first light-shielding layer BMS is directly stacked on the metal line M. The first light-shielding layer BMS and the metal line M can be formed together. As a brief explanation of a method of manufacturing these elements, a metal material for forming the metal line M is first deposited on substantially the entire surface of the fourth insulating film 14. After that, a light-shielding material for forming the first light-shielding layer BMS is deposited on the entire surface of the metal material. As the light-shielding material, a positive resist which becomes soluble in a developer by being exposed to light, for example, is applied. After that, the light-shielding material is patterned to form the first light-shielding layer BMS of a desired shape (for example, the first light-shielding layers BMS in stripes which are located directly above the respective signal lines). Further, by using the first light-shielding layer BMS as a mask, the metal material exposed from the first light-shielding layer BMS is removed by etching, and the metal line M of a desired shape is formed. Note that in a cross section of a stacked layer body of the metal line M and the first light-shielding layer BMS formed in this way, edges E1 and E2 of the metal line M and the first light-shielding layer BMS are not necessarily aligned as illustrated in the drawing. This point will be described later. The stacked layer body of the metal line M and the first light-shielding layer BMS is located at a boundary between the color filters which are adjacent to each other in the first direction X. By this feature, not only when the display device is observed from the front side (i.e., in the third direction Z in the drawing), for example, but also when the display device is observed obliquely, i.e., from a position inclined from the front side, light transmitted through the adjacent color filters of different colors can be blocked, and thus, deterioration in display quality caused by mixture of the colors can be suppressed.

The fifth insulating film 15 covers the metal line M and the first light-shielding layer BMS, suppresses leakage of impurities from the first light-shielding layer BMS, and reduces a step resulting from the metal line M and the first light-shielding layer BMS.

The common electrode CE is located above the first light-shielding layer BMS, and the pixel electrode PE is opposed to the common electrode CE via the sixth insulating film 16. The pixel electrode PE has a slit ST opposed to the common electrode CE.

In the second substrate SUB2, the second light-shielding layer shown in FIG. 4 is not arranged directly above the signal lines S1 and S2, or directly above the metal line M and the first light-shielding layer BMS, and the second insulating substrate 20 is in contact with the overcoat layer OC.

Next, a connection structure for electrically connecting the metal line M and the common electrode CE will be described.

Figure 6:
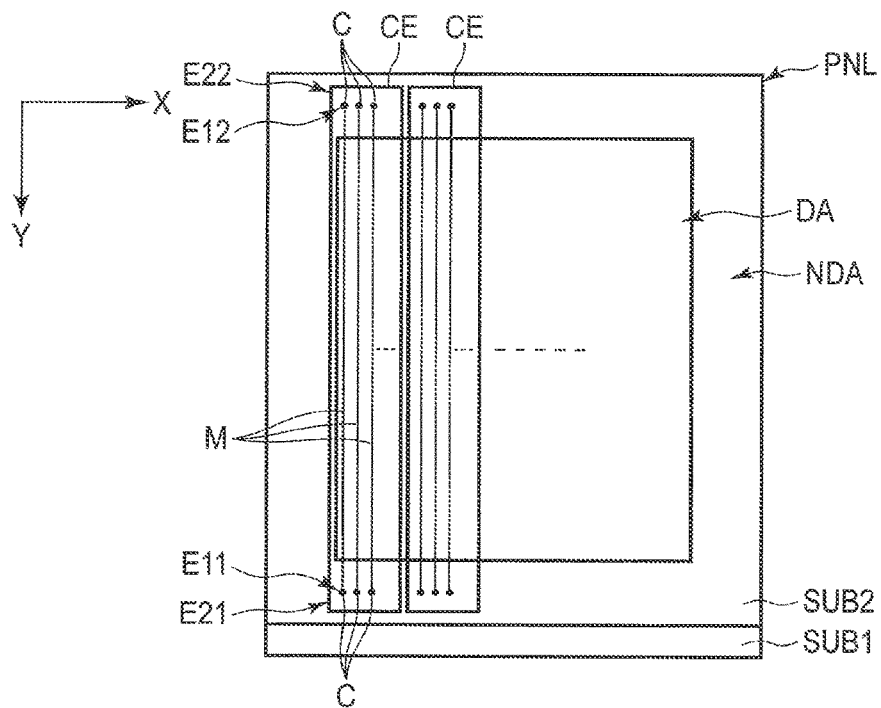
FIG. 6 is an illustration showing an example of connection between a metal line M and a common electrode CE.

FIG. 6 is an illustration showing an example of connection between the metal line M and the common electrode CE.

The metal lines M extend in the second direction Y, and are arranged in the first direction X. Further, the metal lines M are arranged in the display area DA, and also extend to the non-display area NDA. In the example illustrated, both ends E11 and E12 of the metal line M are located in the non-display area NDA.

The common electrodes CE extend in the second direction Y, and are arranged in the first direction X. Further, the common electrodes CE are arranged in the display area DA, and also extend to the non-display area NDA. In the example illustrated, both ends E21 and E22 of the common electrode CE are located in the non-display area NDA. One common electrode CE overlaps a plurality of metal lines M in planar view.

The metal lines M and the common electrode CE are electrically connected to each other at connections C located in the non-display area NDA. In the example illustrated, the connections C are located on both sides of the non-display area NDA so as to sandwich the display area DA. The ends E11 and E21 are electrically connected to each other, and the ends E12 and E22 are electrically connected to each other. Alternatively, the metal lines M and the common electrode CE may be electrically connected to each other only at either of the two ends.

Figure 7:
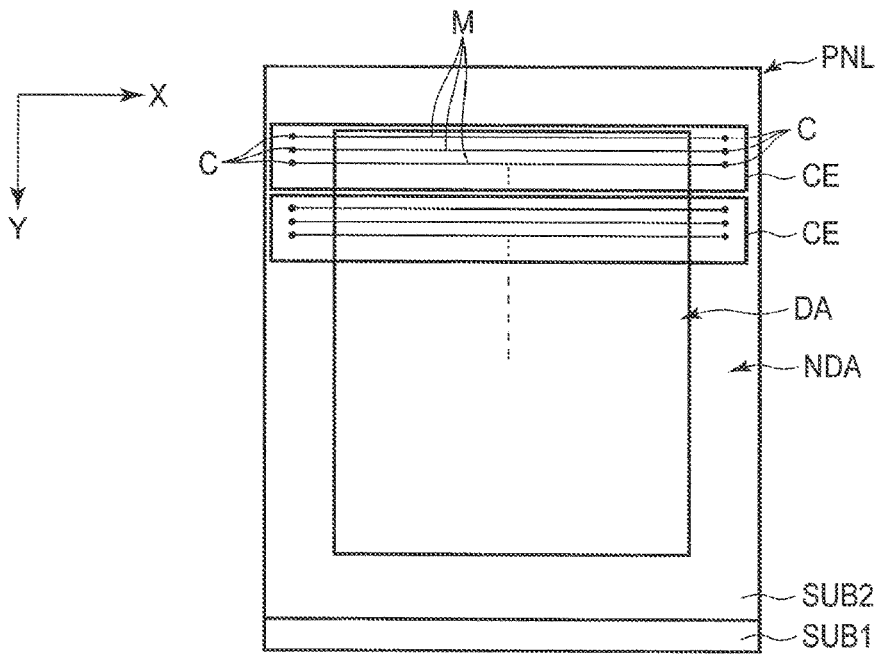
FIG. 7 is an illustration showing another example of connection between the metal line M and the common electrode CE.

FIG. 7 is an illustration showing another example of connection between the metal line M and the common electrode CE.

The illustrated connection example is different from the connection example shown in FIG. 6 in that the metal lines M and the common electrodes CE both extend in the first direction X, and are arranged in the second direction Y. In the example illustrated, the connections C each connecting between the metal line M and the common electrode CE are located on both sides of the non-display area NDA so as to sandwich the display area DA. However, the connections C may be located on only one side of the non-display area NDA.

Figure 8:
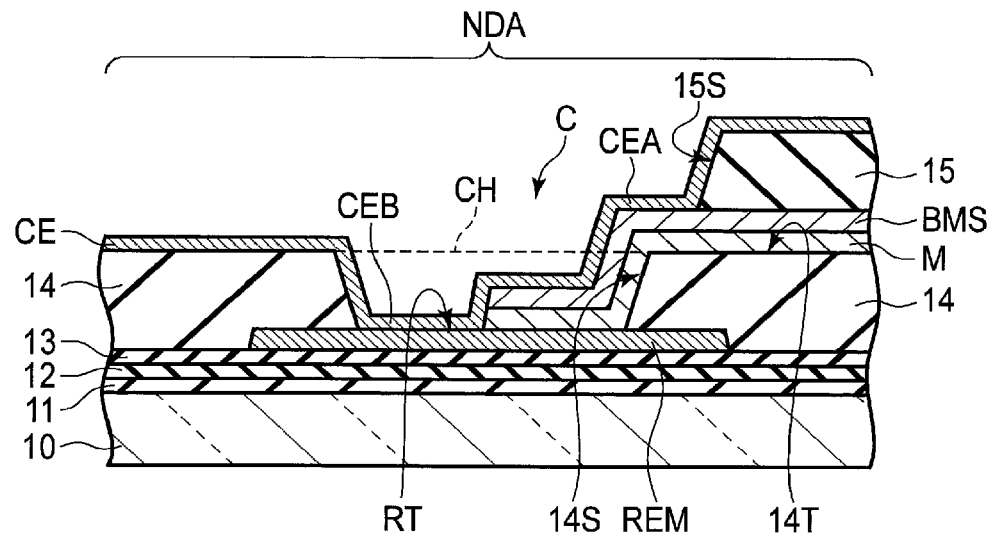
FIG. 8 is a cross-sectional view showing a structural example of a connection C shown in FIGS. 6 and 7.

FIG. 8 is a cross-sectional view showing a structural example of the connection C shown in FIGS. 6 and 7.

As described above, the connections C are located in the non-display area NDA. The first insulating film 11, the second insulating film 12, the third insulating film 13, and the fourth insulating film 14 extend to the non-display area NDA. The connection C comprises a relay electrode REM. The relay electrode REM is located on the third insulating film 13. Such a relay electrode REM is located in the same layer as the signal lines S1 and S2, the relay electrode RE, etc., as has been explained with reference to FIGS. 4 and 5, and is formed of the same material as the relay electrode RE, etc. The relay electrode REM is directly covered with the fourth insulating film 14 without interposition of the color filter layer CF unlike the relay electrode RE in the display area DA. The fourth insulating film 14 includes a contact hole CH which is penetrated to the relay electrode REM. A part of an upper surface RT of the relay electrode REM is located in the contact hole CH.

The metal line M is located on the fourth insulating film 14, also in the non-display area NDA. In the example illustrated, the first light-shielding layer BMS formed together with the metal line M is also extended to the non-display area NDA, and is stacked on the metal line M. The common electrode CE is located on the fourth insulating film 14 without interposition of the fifth insulating film 15 in the left area of FIG. 8 illustrating the non-display area NDA. Each of the metal line M and the common electrode CE is in contact with the upper surface RT of the relay electrode REM in the contact hole CH of the connection C. The metal line M and the common electrode CE are thereby electrically connected to each other. In the example illustrated, the common electrode CE includes a first portion CEA which is in contact with the first light-shielding layer BMS, and a second portion CEB which is in contact with the relay electrode REM. The first portion CEA is overlaid on the first light-shielding layer BMS. The second portion CEB overlaps the upper surface RT of the relay electrode REM in the contact hole CH. It suffices that the common electrode CE is in contact with at least the relay electrode REM. However, as the common electrode CE formed of an oxide conductive material such as ITO covers the first light-shielding layer BMS and the metal line M in the non-display area NDA, corrosion of the metal line M can be suppressed. The metal line M is in contact with each of an upper surface 14T of the fourth insulating film 14, and a side surface 14S of the same facing the contact hole CH, and also with the relay electrode REM in an area overlapping the first portion CEA.

In the display area DA, the common electrode CE is located on the fifth insulating film 15, as shown in FIGS. 4 and 5. Meanwhile, as shown in the right side of FIG. 8 illustrating the non-display area NDA, the fifth insulating film 15 located in the display area DA may include a side surface 15S between the contact hole CH in the non-display area NDA and the display area DA. In such a case, when a part of the common electrode CE is located on the fifth insulating film 15, a structure in which the common electrode CE is located on each of the fifth insulating film 15, the first light-shielding layer BMS, and the relay electrode REM and formed in a stepped configuration should preferably be applied. For example, when the fifth insulating film 15 is extended to a region overlapping the contact hole CH, the contact hole CH must be penetrated through the fourth insulating film 14 and the fifth insulating film 15, and the diameter of the contact hole CH is thereby increased. Further, when the contact hole CH is penetrated through the fourth insulating film 14 and the fifth insulating film 15, the depth of the contact hole CH is increased, and the inclination of the contact hole CH also becomes steep. Accordingly, when the common electrode CE located above the fifth insulating film 15 contacts the relay electrode REM through the contact hole CH, the inclination of the common electrode CE becomes too steep at a contact portion of the relay electrode REM and the common electrode CE, and consequently, a part of the common electrode CE may have a discontinuity. Accordingly, as shown in the drawing, the common electrode CE should preferably be formed to have a stepped cross section.

According to the present embodiment, the first light-shielding layer BMS is stacked on the metal line M provided in the first substrate SUB1. Accordingly, light directed toward the metal line M from the second substrate SUB2 side can be blocked, and undesired reflection at the metal line M can be suppressed, and thus, a reduction of the contrast ratio can be suppressed.

Further, in a structure in which the first light-shielding layer BMS and the fifth insulating film 15 are interposed between the metal line M and the common electrode CE, the metal line M and the common electrode CE are electrically connected to each other in the non-display area NDA. More specifically, the metal line M and the common electrode CE are both extended to the non-display area NDA, and in the non-display area NDA, the metal line M and the common electrode CE are in contact with the relay electrode REM disposed under them. For this reason, a contact hole for connecting the metal line M and the common electrode CE is not required in the display area DA, and it is possible to prevent a difference in level from being formed on the surface of first substrate SUB1 by the contact hole. Consequently, disturbance in alignment of liquid crystal molecules caused by the difference in level of the first substrate SUB1 can be suppressed, and the degradation in display quality can be suppressed.

Also, since the fourth insulating film 14 is located between the color filter layer CF and the metal line M in the first substrate SUB1, not only can leakage of impurities from the color filter layer CF be suppressed, but a difference in level caused by overlapping of edges of the adjacent color filters can also be reduced.

Since the metal line M and the first light-shielding layer BMS are covered with the fifth insulating film 15, leakage of impurities from the first light-shielding layer BMS can be suppressed, and a step formed by the arrangement of the metal line M and the first light-shielding layer BMS can also be reduced.

Since the metal line M and the common electrode CE are electrically connected to each other at their both ends, even if connection failure occurs at one end, electrical connection can be established at the other end, and the reliability can be improved.

Next, the other cross-sectional shapes of the metal line M and the first light-shielding layer BMS will be described with reference to FIGS. 9 to 11. Note that in all of the configuration examples shown in FIGS. 9 to 11, the first light-shielding layer BMS covers the entire surface of an upper surface T1 of the metal line M, and a width W2 of the first light-shielding layer BMS along the first direction X is greater than a width W1 of the metal line M along the first direction X. That is, the edge E2 of the first light-shielding layer BMS is located more outwardly than a position directly above the edge E1 of the metal line M. Note that the width W1 of the metal line M and the width W2 of the first light-shielding layer BMS correspond to lengths along the first direction X between their outermost peripheral edges, respectively. By the above feature, the first light-shielding layer BMS can suppress not only the reflection at the upper surface T1 of the metal line M, but also the reflection at the edge E1.

Figure 9:
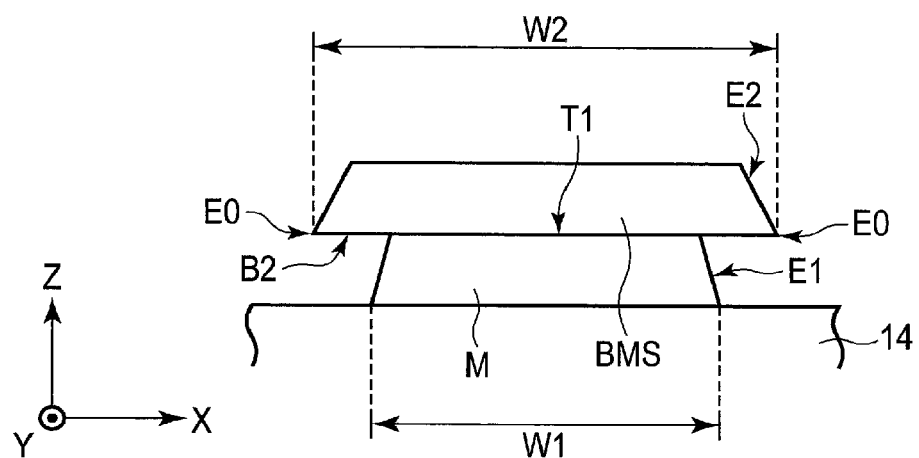
FIG. 9 is an illustration showing another cross-sectional shape of the metal line M and a first light-shielding layer BMS.
Figure 10:
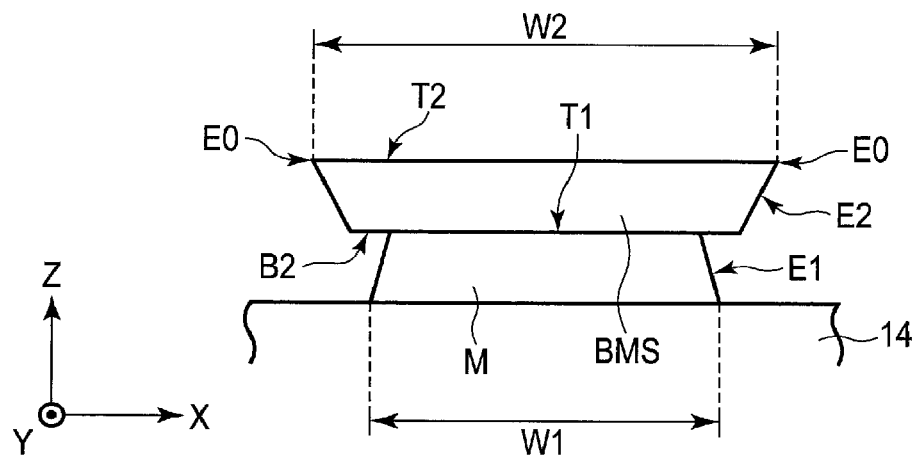
FIG. 10 is an illustration showing yet another cross-sectional shape of the metal line M and the first light-shielding layer BMS.
Figure 11:
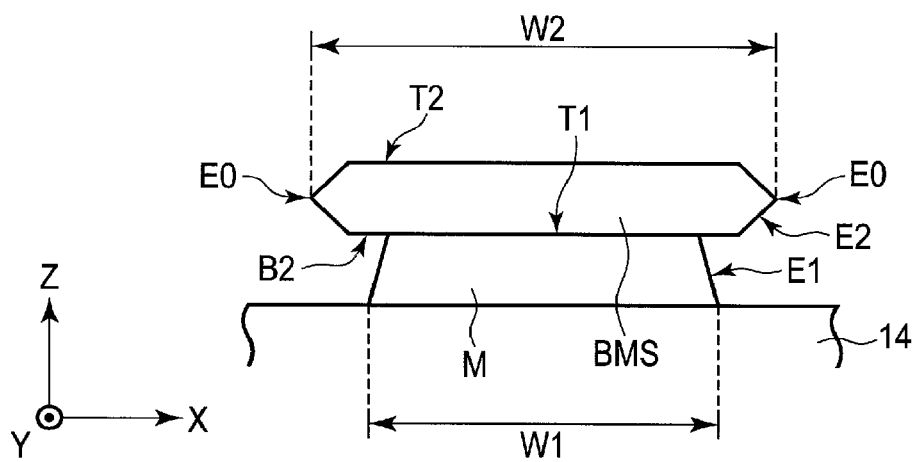
FIG. 11 is an illustration showing yet another cross-sectional shape of the metal line M and the first light-shielding layer BMS.

In each of the configuration examples shown in FIGS. 9 to 11, the metal line M has a forward tapered cross section in which the width W1 along the first direction X is reduced toward the upper side in the third direction Z. Alternatively, the metal line M may have an inverse tapered cross section in which the width W1 along the first direction X is increased toward the upper side in the third direction Z, or may have a cross section of the other shape.

In the configuration example illustrated in FIG. 9, the first light-shielding layer BMS has a forward tapered cross section in which the width W2 along the first direction X is reduced toward the upper side in the third direction Z. An outermost peripheral edge EO of the first light-shielding layer BMS substantially conforms to a peripheral edge of a lower surface B2 of the first light-shielding layer BMS.

In the configuration example illustrated in FIG. 10, the first light-shielding layer BMS has an inverse tapered cross section in which the width W2 along the first direction X is increased toward the upper side in the third direction Z. The outermost peripheral edge EO of the first light-shielding layer BMS substantially conforms to the peripheral edge of an upper surface T2 of the first light-shielding layer BMS.

In the configuration example illustrated in FIG. 11, the first light-shielding layer BMS has an inverse tapered cross section on a side close to the lower layer B2, and has a forward tapered cross section on a side close to the upper surface T2. The outermost peripheral edge EO of the first light-shielding layer BMS is located between the lower surface B2 and the upper surface T2 of the first light-shielding layer BMS.

Next, a configuration example of a sensor SS which can be mounted in the display device DSP of the present embodiment will be described. The sensor SS which will be described below is, for example, a mutual-capacitive sensor, which detects touch or approach of an object, based on a variation in the electrostatic capacitance between a pair of electrodes opposed to each other with a dielectric interposed between the electrodes.

FIG. 12 is a plan view showing a configuration example of the sensor SS.

In the configuration example illustrated, the sensor SS comprises a sensor drive electrode Tx and a detection electrode Rx. The sensor drive electrode Tx includes the above-described common electrode CE and the metal line M, has the function of producing an electric field between the sensor drive electrode Tx and the pixel electrode PE, and also has the function of detecting the position of an object by producing a capacitance between the sensor drive electrode Tx and the detection electrode Rx. In the example illustrated, the sensor drive electrode Tx corresponds to a part indicated by oblique lines sloped downward to the right, and is provided on the first substrate SUB1. Further, the detection electrode Rx corresponds to a part indicated by oblique lines sloped upward to the right, and is provided on the second substrate SUB2. In one example, the detection electrode Rx is arranged between the second insulating substrate 20 and the second optical element 20 shown in FIG. 4.

The sensor drive electrode Tx and the detection electrode Rx cross each other in the X-Y plane illustrated. In the example illustrated, the sensor drive electrodes Tx are each formed in a strip shape extending in the second direction Y, and are arranged to be spaced apart from each other in the first direction X. The detection electrodes Rx extend in the first direction X, and are arranged to be spaced apart from each other in the second direction Y. The detection electrode Rx is opposed to the sensor drive electrode Tx in the third direction Z. Note that the number, size, and shape of the sensor drive electrode Tx and the detection electrode Rx are not particularly limited, and can be changed variously.

The sensor drive electrodes Tx and the detection electrodes Rx are located in the display area DA, and extend to the non-display area NDA in part. Each of the detection electrodes Rx is electrically connected to a detection circuit RC via a wiring line WR. Each of the sensor drive electrodes Tx is electrically connected to the common electrode drive circuit CD via a wiring line WT.

The common electrode drive circuit CD supplies a common drive signal to the sensor drive electrode Tx including the common electrode CE at a display drive time of displaying an image in the display area DA. Also, the common electrode drive circuit CD supplies a sensor drive signal to each of the sensor drive electrodes Tx at a sensing drive time of performing the sensing. Each of the detection electrodes Rx outputs a sensor signal necessary for sensing (that is, a signal based on a change in the interelectrode capacitance between the sensor drive electrode Tx and the detection electrode Rx) in accordance with supply of the sensor drive signals to the sensor drive electrodes Tx. A detection signal output from the detection electrode Rx is input to the detection circuit RC. The detection circuit RC reads the detection signal output from the detection electrode Rx, and detects whether touch or approach of the object has been made, and also position coordinates, etc., of the object.

Note that the sensor SS in each of the configuration examples described above is not limited to a mutual-capacitive sensor which detects an object based on a change in the electrostatic capacitance between a pair of electrodes (in the above example, the electrostatic capacitance between the sensor drive electrode Tx and the detection electrode Rx), but may be a self-capacitive sensor which detects an object based on a change in the electrostatic capacitance of the detection electrode Rx.

As explained above, according to the present embodiment, a display device capable of suppressing deterioration in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first substrate including an insulating substrate, a color filter layer located above the insulating substrate, a signal line located between the insulating substrate and the color filter layer, a metal line located above the color filter layer, a first light-shielding layer stacked on the metal line, a common electrode located above the first light-shielding layer, a pixel electrode opposed to the common electrode;
    a second substrate opposed to the first substrate; and
    a liquid crystal layer held between the first substrate and the second substrate, wherein the display device further comprises a display area in which the metal line, the pixel electrode, and the common electrode are arranged, a non-display area surrounding the display area, and a relay electrode located above the insulating substrate in the non-display area, and the metal line and the common electrode extend to the non-display area, are in contact with the relay electrode, and are electrically connected to each other.

2. The display device of claim 1, further comprising a first organic insulating film located between the color filter layer and the metal line, and a second organic insulating film which covers the first organic insulating film, the metal line, and the first light-shielding layer.

3. The display device of claim 2, wherein:
the first organic insulating film directly covers the relay electrode without interposition of the color filter layer, and includes a contact hole penetrated to the relay electrode, in the non-display area; and
the metal line and the common electrode are in contact with the relay electrode at the contact hole.

4. The display device of claim 1, wherein the metal line includes both ends located in the non-display area, and the both ends are each electrically connected to the common electrode.

5. The display device of claim 1, wherein the first light-shielding layer covers an upper surface of the metal line, and a width of the first light-shielding layer is greater than a width of the metal line.

6. The display device of claim 1, wherein:
the color filter layer includes a first color filter of a first color, and a second color filter of a second color different from the first color;
an edge of each of the first color filter and the second color filter overlaps the signal line; and
the metal line is located directly above the signal line.

7. The display device of claim 1, wherein:
the first substrate comprises a scanning line intersecting the signal line; and
the second substrate comprises a second light-shielding layer overlapping the scanning line.

8. A display device comprising:
a display area;
a non-display area surrounding the display area;
a relay electrode located in the non-display area;
a first interlayer insulating film located above the relay electrode;
a metal line extending above the first interlayer insulating film in the display area and the non-display area;
a second interlayer insulating film located above the first interlayer insulating film and the metal line; and
a common electrode extending above the second interlayer insulating film the display area and the non-display area,
the first interlayer isolating film including a contact hole penetrated to the relay electrode,
the metal line and the common electrode being in contact with the relay electrode at the contact hole.

9. The display device of claim 8, further comprising a signal line which is located in the display area, and is covered with the first interlayer insulating film.

10. The display device of claim 8, wherein:
the first interlayer insulating film includes a color filter layer located in the display area, and a first organic insulating film located above the color filter layer in the display area and extending to the non-display area; and
the contact hole is formed in the first organic insulating film.

11. The display device of claim 10, wherein the first organic insulating film is in contact pith the relay electrode without interposition of the color filter layer.

12. The display device of claim 8, further comprising a light-shielding layer which is stacked on the metal line and is covered with the second interlayer insulating film.

13. The display device of claim 12, wherein the light-shielding layer covers an upper surface of the metal line, and a width of the light-shielding layer is greater than a width of the metal line.

14. The display device of claim 12, wherein the common electrode includes a first portion in contact with the light-shielding layer, and a second portion in contact with the relay electrode at the contact hole.

15. A display device comprising:
a first substrate including an insulating substrate, a signal line, a first organic insulating film located above the signal line, a metal line located above the first organic insulating film, an insulator stacked on the metal line, a second organic insulating film which covers the insulator, a common electrode located above the second organic insulating film, and a pixel electrode opposed to the common electrode;
a second substrate opposed to the first substrate; and
a liquid crystal layer held between the first substrate and the second substrate, wherein
the metal line is in contact with the first organic insulating film;
the insulator is not in contact with the first organic insulating film; and
the second organic insulating film is in contact with each of the metal line, the insulator, and the first organic insulating film.

16. The display device of claim 15, further comprising a display area, a non-display area surrounding the display area, and a relay electrode located in a same layer as the signal line in the non-display area, wherein:
the common electrode is located on the second organic insulating film in the display area; and
the common electrode includes a first portion in contact with the insulator, and a second portion in contact with the relay electrode in the non-display area.

17. The display device of claim 16, wherein:
the metal line is in contact with an upper surface and a side surface of the first organic insulating film, and the relay electrode, in an area overlapping the first portion; and
the metal line and the common electrode are electrically connected to each other via the relay electrode.

18. The display device of claim 17, further comprising a color filter layer located between the signal line and the first organic insulating film in the display area, wherein
the first organic insulating film is in contact with the relay electrode without interposition of the color filter layer.

* * * * *